United States Patent [19]

Marshall

[11] Patent Number: 4,893,393

[45] Date of Patent: Jan. 16, 1990

[54] PIPE FITTING ASSEMBLY TOOL

[76] Inventor: Ben C. Marshall, 31 Walker Ave., Gaithersburg, Md. 20877

[21] Appl. No.: 261,960

[22] Filed: Oct. 25, 1988

[51] Int. Cl.⁴ ............................................. F16L 35/00
[52] U.S. Cl. ...................................... 29/237; 29/267; 29/272; 269/43
[58] Field of Search ................ 228/49.3; 29/237, 267, 29/268, 272, 235, 238, 239; 254/29 R; 269/37, 43

[56] References Cited

U.S. PATENT DOCUMENTS

| 1,170,334 | 2/1916 | Riggs | 29/272 |
|---|---|---|---|
| 3,257,714 | 6/1966 | Duke et al. | 29/237 |
| 3,364,555 | 1/1968 | Swink | 29/237 |
| 3,668,766 | 6/1972 | Carter et al. | 29/237 |
| 3,716,079 | 2/1973 | Marshall | 269/43 |
| 4,054,984 | 10/1977 | Ball et al. | 269/43 |
| 4,257,135 | 3/1981 | Moebius | 29/268 |
| 4,757,588 | 7/1988 | Churchich | 29/268 |

FOREIGN PATENT DOCUMENTS 609346  9/1948  United Kingdom ................. 269/43

Primary Examiner—Robert C. Watson
Attorney, Agent, or Firm—William F. Hamrock

[57] ABSTRACT

A pipe fitting assembly tool for connecting and disconnecting pipes including a pair of clamps which are attached to separate lever clamping systems which control clamping and unclamping the pipes and which are pivotally attached to scissors structured handle bars which control the movement of the clamps to and from each other.

7 Claims, 2 Drawing Sheets

PIPE FITTING ASSEMBLY TOOL

BACKGROUND OF THE INVENTION

This invention is directed to a scissors type mechanism that provides a mechanical advantage to the operator in pulling two sections of pipe toward a common center point. In particular, it is designed for the assembly and disassembly of plastic pipes below ground level.

In the past, considerable difficulty has been experienced in properly holding a pair of plastic pipes in confronting and abutting relationship while the members were joined end to end or when pipes were disassembled. This is especially true when the two pipes had to be accurately joined together or when the pipe had to be disassembled in underground narrow trenches.

The difficulty was greatly increased especially where the plastic pipes were curved. For example, plastic pipes are packaged in coils which may result in the pipes having an arc which creates difficulties in keeping the pipes straight when joining them.

While endeavors have been made in the past to provide a suitable clamping and holding mechanism for such purposes, previously known attempts have resulted in objectionable apparatus wherein the operator cannot use it in narrow trenches and at the same time cannot work directly above the pipes to be serviced. Further difficulties encountered with prior art systems include poor functioning of the apparatus if it is not clean, gloves are required to be worn by the operator and tools are required for manual adjustment of the component parts.

U.S. Pat. No. 4,015,323 is directed to a tool for mating two pipes. That tool is entirely different from the scissors structured, cam locking mechanism of the present invention which permits it to be dropped into narrow trenches and to be activated directly above the pipes. Prior art tools cannot achieve this versatility.

SUMMARY OF THE INVENTION

In accordance with the present invention, a pipe assembly tool is provided which solves the problems of the prior art.

The pipe fitting assembly tool of the present invention includes 2 clamps, each of which is secured to a clamping lever which is attached to scissors like handle bars. The scissors handle bars operate to move the clamps, each containing a pipe section, toward each other in order to join the pipes together. They also operate to move the clamped pipe sections away from each other in order to disengage pipe sections. The tool is designed for pipes that use interfittings such as a coupling, elbow, tee, 90 or other fitting. The fitting is usually connected to one end of the length of pipe and then the other pipe end is brought up to connect thereto through the use of the tool.

The scissors type mechanism provides a mechanical advantage to the operator in pulling two sections of pipe toward a common center point. Because of the scissors design and the clamps at each end, the tool can be dropped into trenches to make pipe repairs, add-ons or retrofits.

The tool can be adapted to fit any smaller size diameter pipe by means of "faces." They inlay and attach to the inside of the clamps decreasing the inside diameter so as to apply the prescribed pressure to a smaller sized pipe.

The clamps are cam lever types. As the cam lever arm is operated, the cam further secures the clamps together around the pipe and locks securely when the lever arm is fully extended.

A straight alignment bar is attached to a lever arm of one clamp and slides within the lever arm of the other clamp. By sliding along the bar, the clamps are maintained on a straight line along a single plane when they are spread apart and remain perfectly opposed to each other. The alignment bar is able to correct for the radial travel route the scissors fulcrum forces the clamps to travel. The alignment bar also assists in overcoming any curvature in the plastic pipe by keeping the two pipe ends perfectly opposed to each other for mating.

The axle or fulcrum is placed upon the handle bars to provide leverage of at least 7 to 1. The scissors handle bar length is about 4 feet or more.

The tool is operated by placing the ends of the pipes into the clamps and closing the clamps thereon by manually adjusting the clamping levers. The ends of the pipes are allowed to overlap the clamps a short distance. This permits the fitting to be freely inserted in a pipe end and is thereby not compressed by the clamp. The pipes are forced together with great force by bringing the scissors handle bars together. The fitting is thereby attached within both pipes and the pipes securely joined.

There are numerous advantages of the present tool over prior art tools.

1. It is easy to use not only for joining pipes but also for disassembling completed sections.

2. It is lightweight, can be used in the field or shop, can be operated by wearing gloves and can be used in wet, dirty environments without affecting its performance.

3. It can be operated in narrow trenches by one worker standing directly above the pipes to be serviced. Its handles length of usually about 4 feet permits the worker to assume a comfortable position. It takes up less horizontal space perpendicular at the pipe plane.

4. It has preset clamp pressure which requires no adjustment, is less time consuming, no overtightening and more durable to rough use.

5. Its faces do not require nuts or threads for attachment to the clamps.

6. Its scissors design inherently causes the created leverage to oppose itself which produces a stabilized tool and allows one worker to evenly pull the pipes together as opposed to prior art tools which awkwardly pull one pipe toward an anchored second pipe.

7. It can be operated from a bench by simply orienting the handles horizontally near the waist of the operator.

8. It does not damage the ends of the fittings during the pipe joining procedure. Prior art tools cause such damage to the fittings, which damage often does not appear until the pipes are back in service and results in additional damage to the surroundings.

9. It does not require lubricants for pipe joining because the leverage created by the present tool overcomes this need. Lubrication of the fittings permits the fittings to slip out more easily underground as the ground settles.

DESCRIPTION OF THE PREFERRED EMBODIMENT

Figures 1, 2:
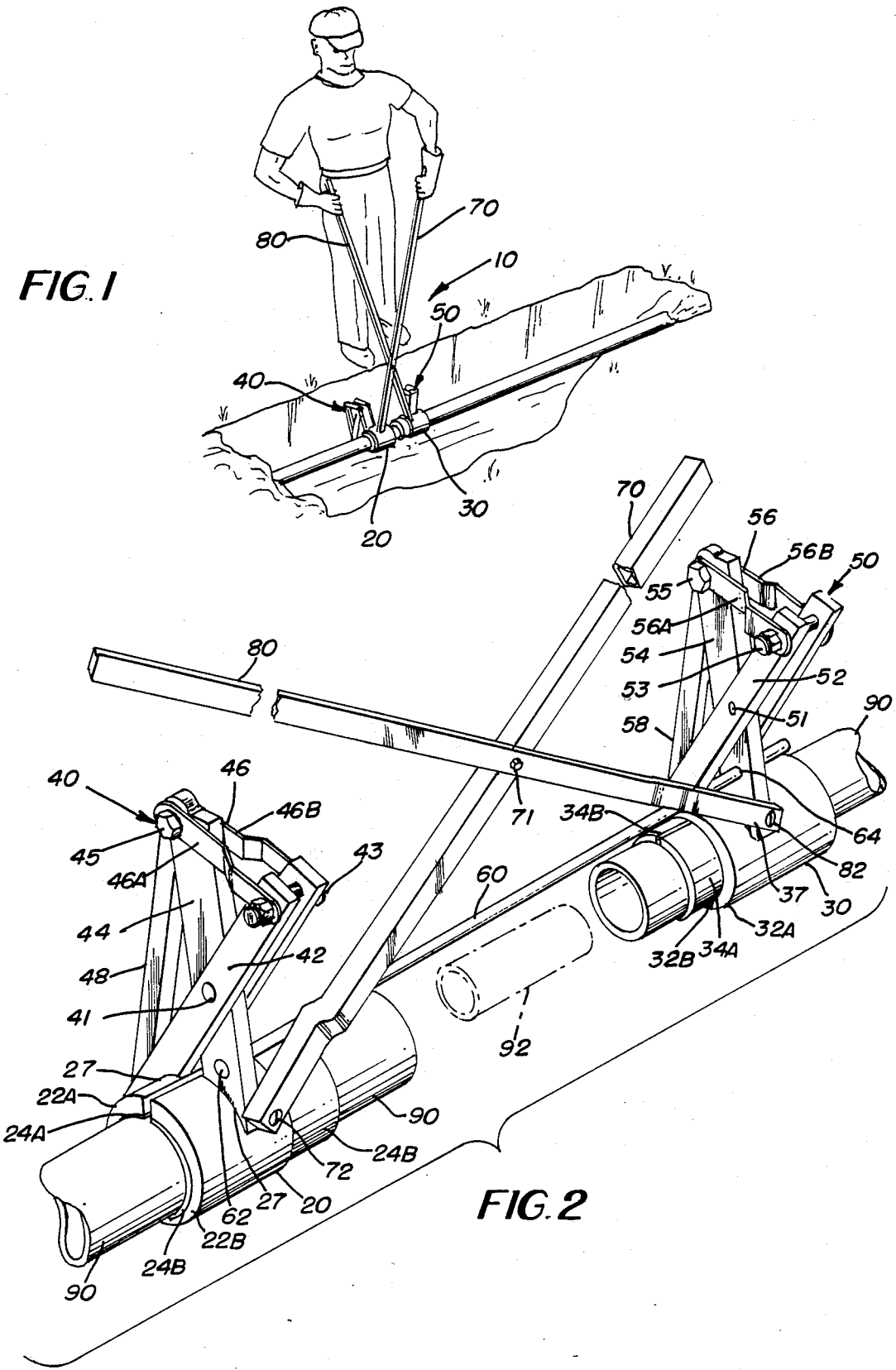
FIG. 1 is an overall perspective view of the tool in operation showing an operator standing on the top side of a trench with the tool resting on the bottom of the trench.
FIG. 2 is an overall perspective view of the tool in its entirety.

Pipe fitting assembly tool 10 (FIG. 1) includes clamps 20 and 30, clamping levers 40 and 50 and scissors handle bars 70 and 80 as shown in FIG. 2.

The clamps are attached to the clamping levers which are attached to the scissors handle bars. Clamps 20 and 30 include half clamps 22A and 22B and 32A and 32B, respectively. The length of said clamps depends upon the outside diameter of the pipes to be assembled or disassembled; the greater the diameter, the longer the length of said clamps. The inside diameter of the closed clamps for gripping the pipes depends upon the outside diameter of the pipes. Said clamps can be adapted to grip various size pipes by means of "faces" which are curved spaces 24A and 24B and 34A and 34B, respectively and are releasably secured to the interior of said clamps by releasable securing means such as nut or similar material.

Clamp halves 22A and 32A are firmly secured to double lever arms 42 and 52, respectively, by securing means 27 and 37 such as brazing, welding, nuts, bolts or similar means. Clamp halves 22B and 32B are firmly secured to cam arms 44 and 54 by similar securing means 27 and 37 and are pivotally attached to scissors handle bars 70 and 80 by nuts 72 and 82 or similar means. Double lever arm 42 and cam lever arm 44, and double lever arm 52 and cam lever arm 54, are pivotally joined by pivotal securing means 41 and 51 such as nut and bolt, pin, rod or similar means to form a small scissors type structure in each clamping lever.

Lever arms 46 and 56 include parallel arms 46A and 46B, and 56A and 56B, respectively. Said arms 46 and 56 are pivotally secured to double lever arms 42 and 52 by pivotal securing means 43 and 53 such as nuts and bolts, pins, rods and similar means at one end and are pivotally secured to cam follower arm 48 and 58 by pivotal securing means 45 and 55 such as similar means as to the above at the other end.

The lever clamping assembly controls the clamping and unclamping of clamps 20 and 30 to pipe 90. Cam lever arms 44 and 54 and lever arms 42 and 52 are operated manually to open and close said clamps. By manually pulling apart arms 44 and 42, and 54 and 52, clamp halves 22A and 22B and 32A and 32B open up to fit around the pipe. By pushing together arms 44 and 42, and 54 and 52, said clamp halves close down around the pipe. The clamped pipe is further securely locked within the closed clamps by extending cam follower arms 48 and 58 down over cam arms 44 and 54, respectively. It unlocks simply by pulling up in reverse to the original release position. The cam arms on the clamps are of the over-center type that lock down once they have been pushed past the center point.

Figure 3:
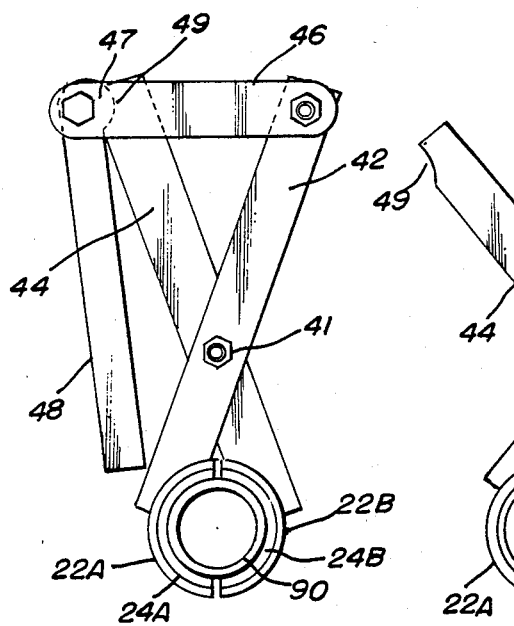
FIG. 3 is a front view of one the clamps in the closed position.
Figure 4:
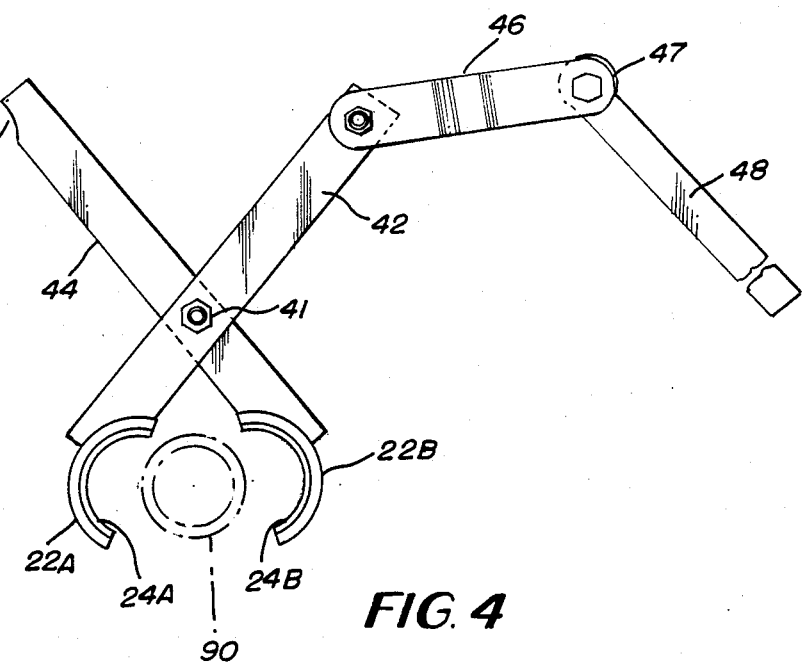
FIG. 4 is a view similar to FIG. 3 with the clamp in the open position.

FIG. 3 and FIG. 4 show the clamping and unclamping procedure as applied to clamp 22. The same procedure is applicable to clamp 32. FIG. 3 is a front view of clamp 22 in the closed position around a length of pipe 90. FIG. 4 is a view similar to FIG. 3 with clamp 22 in the open position wherein pipe 90 is drawn in phantom line.

Alignment bar 60 is a straight rod affixed to cam lever arm 44 by joining means 62 such as threads or similar means and slideably extending through cam lever arm 54 opening 64 as shown in FIG. 2. In the alternative, the opposite attachment of the alignment bar to cam lever arm 54 while slideably extending through cam lever arm 44 would likewise be satisfactory. The alignment bar by being a straight rod assists in holding the clamps 20 and 30 perfectly opposed to each other and also assists in straightening and holding the curved plastic pipe in abutting relationship while the pipe members are joined end to end. Scissors handle bars 70 and 80 are pivotally joined by pivotal means 71 such as pin, rod, bolts or similar means to form a scissors structure as shown in FIG. 2.

An interfitting 92 is drawn in phantom in FIG. 2. It is usually fitted within one end of a pipe 90 and the pipes brought together by bringing the scissors handle bars together. The fitting can be a coupling, elbow, tee, 90 or other fitting.

Figure 5:
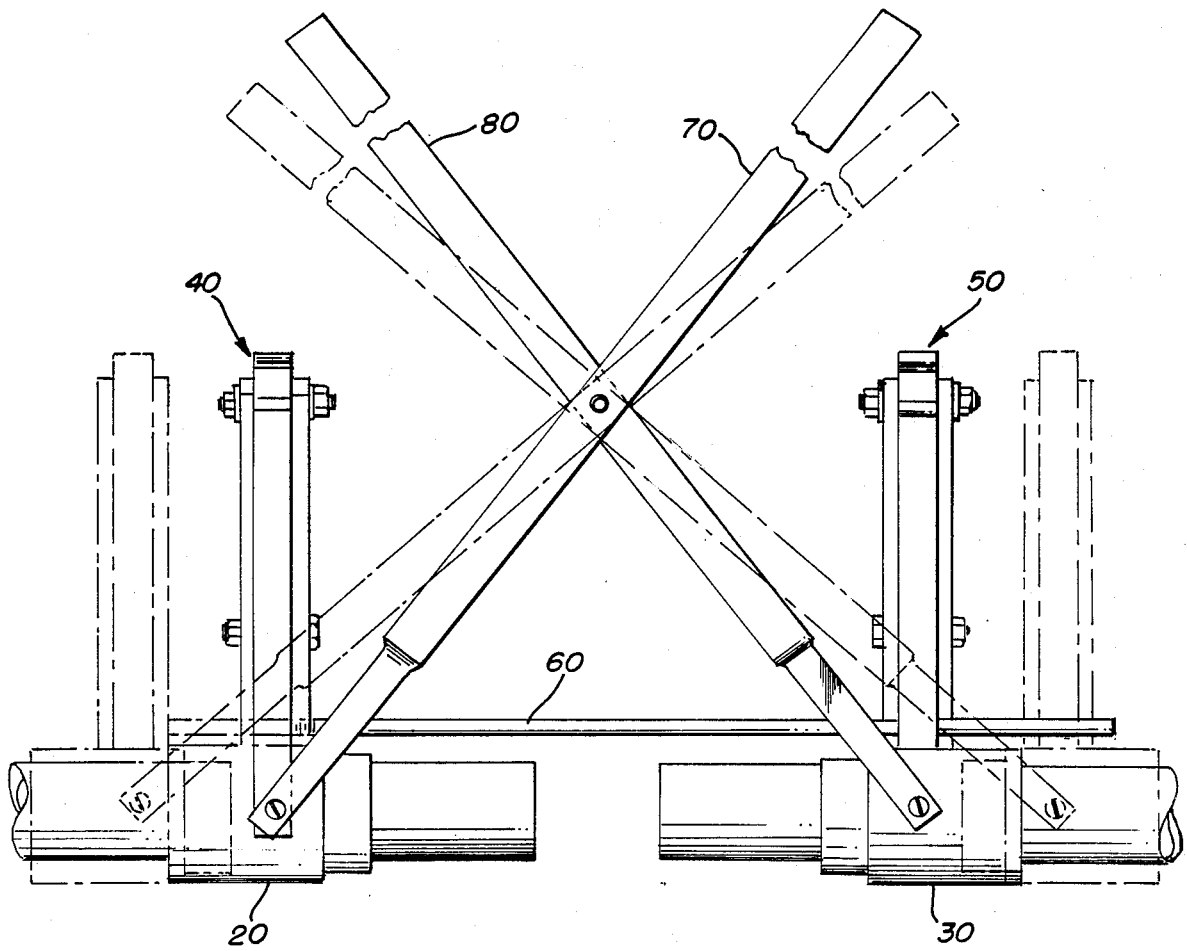
FIG. 5 is a side elevation view of the device.

FIG. 5 demonstrates how clamps 20 and 30 are maintained on a straight line when they are spread apart by virtue of alignment bar 60. The clamps are shown in the far open position in phantom line.

Further, it will be apparent to those skilled in the art from the foregoing description and accompanying drawings that additional modifications and/or changes of the disclosed embodiment may be made without departure from the invention. Accordingly, it is expressly intended that the foregoing description and accompanying drawings are illustrative of a preferred embodiment only, not limiting, and that the true spirit and scope of the present invention be determined by reference to the appended claims.

What is claimed is:

1. A pipe fitting assembly tool for connecting and disconnecting pipes comprising:

a pair of lever clamping systems including a pair of clamps which encircle and lock the pipes, each of said clamps includes a pair of opposing arcuate half clamps, each of said half clamps pivotally connected by means of a separate straight lever arm secured thereto and extending upwardly and inwardly therefrom and pivotally attached to each other above said clamps in scissors structure which open and close said half clamps said lever arms adjustably joined at the top by a pivotally attached cam lever locking system, each of said clamping systems is pivotally attached to the bottom of long straight separate handle bars extending upwardly therefrom and which are pivotally attached to each other in a scissors structure, whereby said clamping systems operate locking and unlocking of the pipes in the clamps and said handle bars operate movement of the locked pipes along a single plane to and from each other.

2. An assembly tool according to claim 1 wherein each cam lever arm locking system includes two pivotally attached lever arms.

3. An assembly tool according to claim 2 including a straight alignment bar slideably attached to the lever clamping system above the clamps.

4. An assembly tool according to claim 3 wherein inlay faces are attached within the clamp halves.

5. An assembly tool according to claim 4 for use on a pipe containing an interfitting.

6. An assembly tool according to claim 4 wherein said handle bars are about four feet in length.

7. An assembly tool according to claim 6 for use on pipes located within a trench below ground level.

* * * * *